United States Patent [19]
Baker, III et al.

[11] Patent Number: 5,222,908
[45] Date of Patent: Jun. 29, 1993

[54] BRIDGE ASSEMBLY

[75] Inventors: Frank P. Baker, III, Chatham; Bassel H. Daoud, Parsippany; Neal A. Janus, Randolph, all of N.J.

[73] Assignee: AT&T Bell Laboratories, Murray Hill, N.J.

[21] Appl. No.: 874,319

[22] Filed: Apr. 27, 1992

[51] Int. Cl.5 .......................................... H01R 13/74
[52] U.S. Cl. .................................. 439/557; 379/328
[58] Field of Search ............... 439/49, 709, 676, 544, 439/552-557; 379/325-332, 379, 387, 433, 442, 399; 361/398, 429

[56] References Cited

U.S. PATENT DOCUMENTS

| | | | |
|---|---|---|---|
| 4,143,932 | 3/1979 | Boutros | 361/398 |
| 4,396,809 | 8/1983 | Brunssen | 379/201 |
| 4,636,591 | 1/1987 | Kuhfus et al. | 381/159 |
| 4,949,376 | 8/1990 | Nieves et al. | 379/442 |
| 4,958,260 | 9/1990 | Kobayashi et al. | 361/398 |
| 5,004,433 | 4/1991 | Daoud | 439/502 |
| 5,044,981 | 8/1991 | Suffi et al. | 439/676 |

Primary Examiner—Neil Abrams
Attorney, Agent, or Firm—Lester H. Birnbaum

[57] ABSTRACT

Disclosed is a bridge assembly for mounting within a network interface unit. The assembly includes a jack and a housing for an integrated circuit which are molded into a single entity. The housing and jack are separated by a flexible hinge which permits the bridge assembly to be mounted in the chassis of the network interface unit.

7 Claims, 4 Drawing Sheets

BRIDGE ASSEMBLY

BACKGROUND OF THE INVENTION

This invention relates to network interface units for telecommunications equipment.

A network interface unit is a terminal found in most buildings having several subscribers, and includes an array of bridges, each coupled to a subscriber in the building. Each bridge is also coupled to the telecommunications network through a standard RJ11 plug so that the subscriber can disconnect his premises equipment and plug a working phone directly into the network for testing purposes (see, e.g., U.S. Pat. No. 5,004,433, issued to Daoud). This apparatus permits the subscriber to determine if any problem lies in the network or with his or her own equipment or wiring.

A maintenance termination unit (MTU) also allows the phone company to determine where a service problem lies. The MTU permits the central office to electronically disconnect the customer equipment by transmitting a particular voltage signal and then determine if any communication problems are in the network or in the customer equipment (see e.g., U.S. Pat. No. 4,396,809 issued to Brunssen).

It is economically desirable to provide MTUs in the same terminal unit as the customer bridges. Typically, each MTU is formed on a printed circuit board with four wires extending therefrom for splicing onto the wires of the network side of the unit. Finding the right pairs of wires, and then cutting and splicing the wires for each MTU are time consuming and awkward when the MTUs are originally installed or have to be replaced.

One approach to this problem is shown in U.S. patent application Ser. No. 07/843,136, filed Feb. 28, 1992. There, each MTU is mounted in slots in the terminal housing beneath the customer bridges. Each MTU is coupled to a mother board perpendicularly thereto and coupled to an RJ11 jack by a pair of electrical connectors of the MTU board.

It is desirable to provide an alternative approach to mounting an MTU or other component in a network interface unit. It is particularly desirable to be able to mount the component from the front of the network interface unit.

SUMMARY OF THE INVENTION

This and other objects are achieved in accordance with the invention, which is a device including a jack, and a housing including an electronic component therein electrically coupled to the jack. The device further includes a flexible hinge separating the jack and housing. The jack, housing and hinge are molded from a single material.

BRIEF DESCRIPTION OF THE DRAWING

These and other features of the invention are delineated in detail in the following description. In the drawing.

It will be appreciated that, for purposes of illustration, these figures are not necessarily drawn to scale.

DETAILED DESCRIPTION

Figure 1:
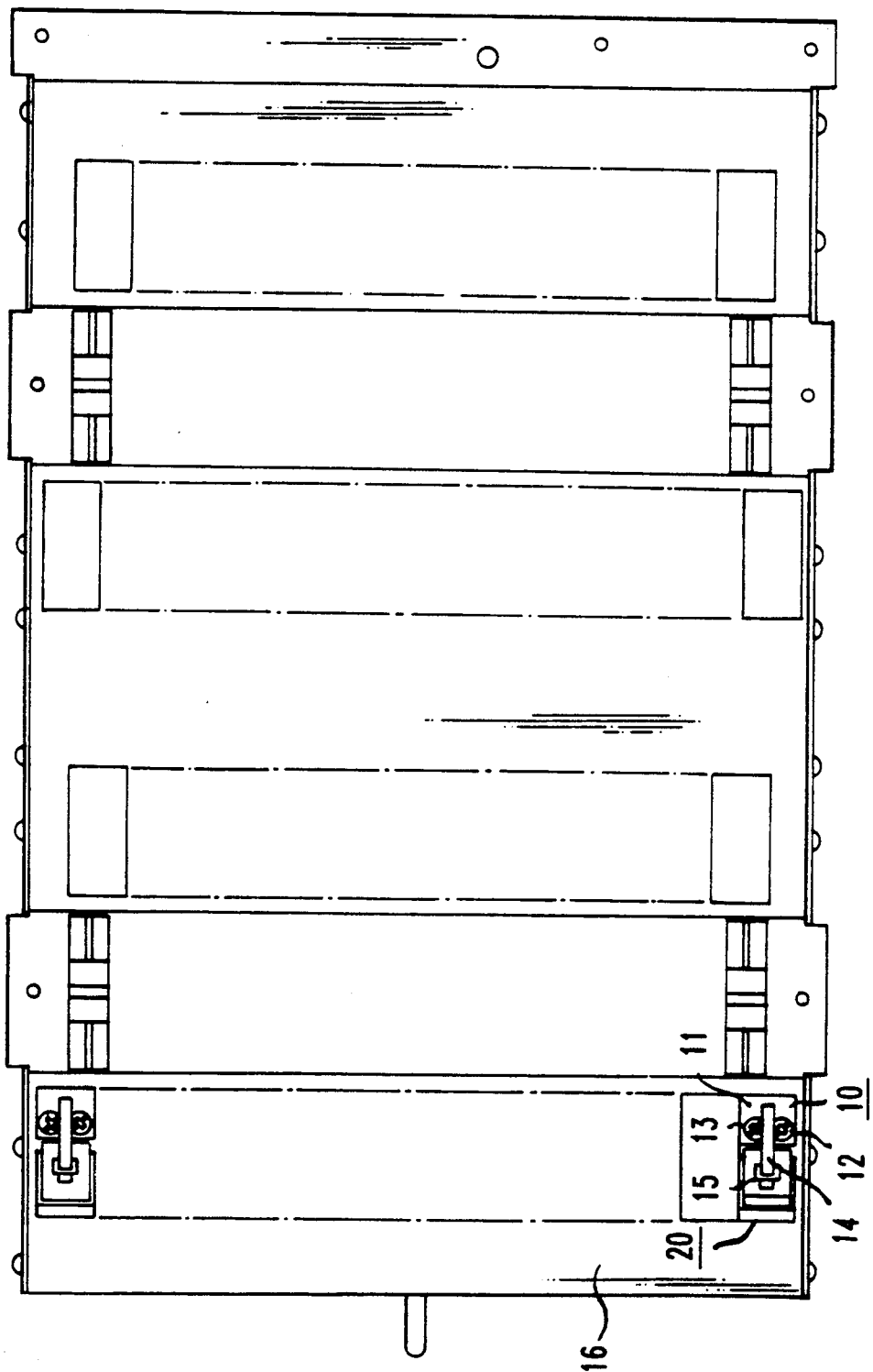
FIG. 1 is a top view of a typical network interface unit which incorporates the invention.

FIG. 1 illustrates a standard type of network interface unit incorporating the invention. This particular unit includes four rows of customer bridges, e.g., 10, only two of which are illustrated in detail. Each bridge includes a connector 11 which comprises a pair of screws, 12 and 13, electrically coupled to the customer equipment by means of wires (not shown) secured by the screws. The screws, 12 and 13, are also electrically coupled to a pair of wires (not shown) formed within a protective jacket 14, which emerges from the body of the connector 11. The wires terminate in a standard RJ11 plug 15. The connector 11 also includes latches (not shown) for mounting in the chassis, 16, of the unit. (For an example of a connector unit which may be used in a network interface unit, see U.S. Pat. No. 5,004,433 issued to Daoud and incorporated by reference herein.)

Figure 2:
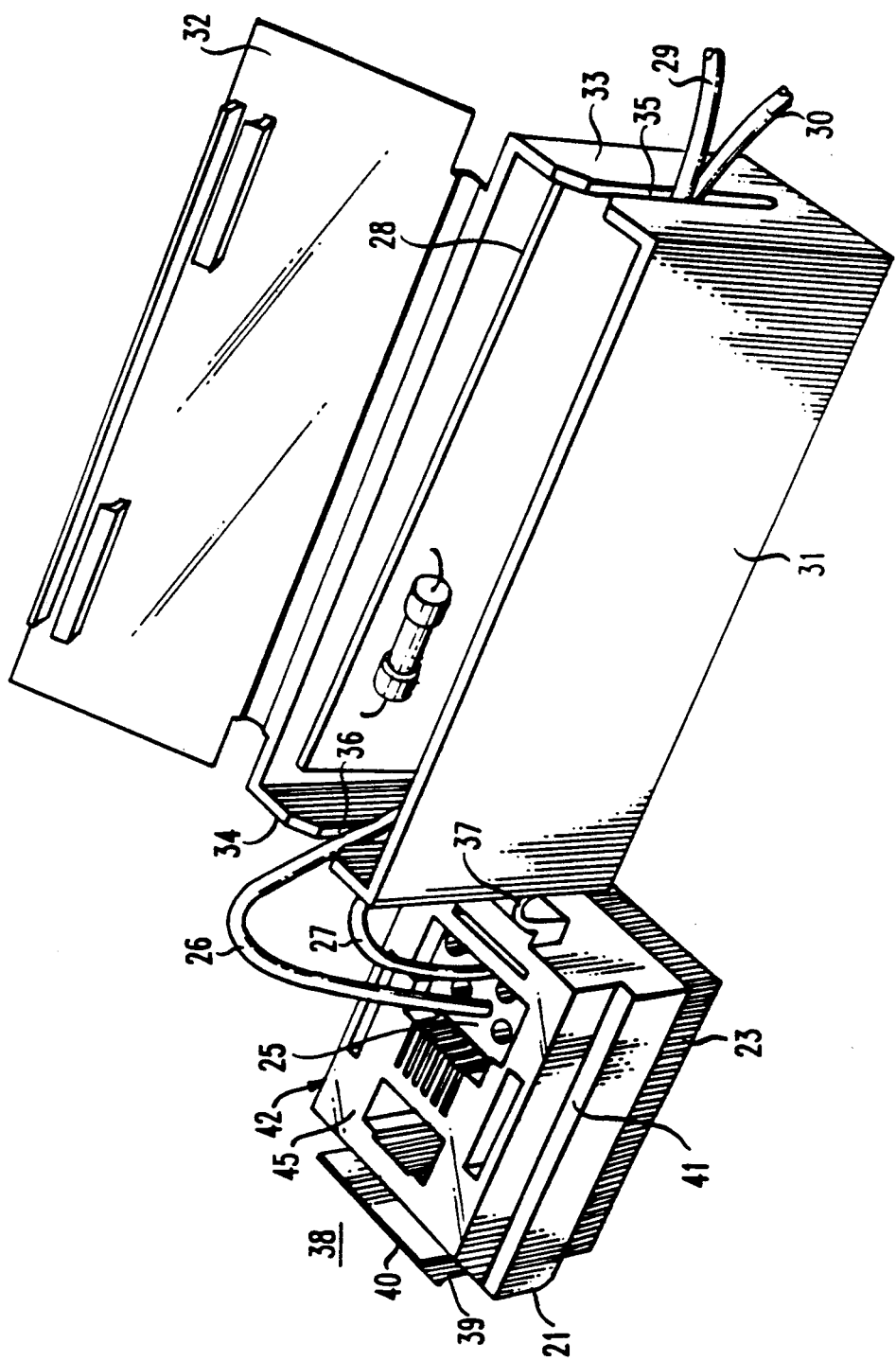
FIG. 2 is a perspective view of a bridge assembly in accordance with an embodiment of the invention.
Figure 4:
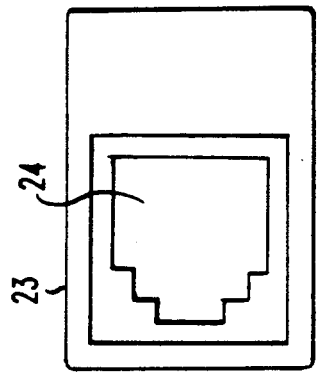
FIG. 4 is a top view of a further portion of the assembly of FIG. 2.
Figure 3:
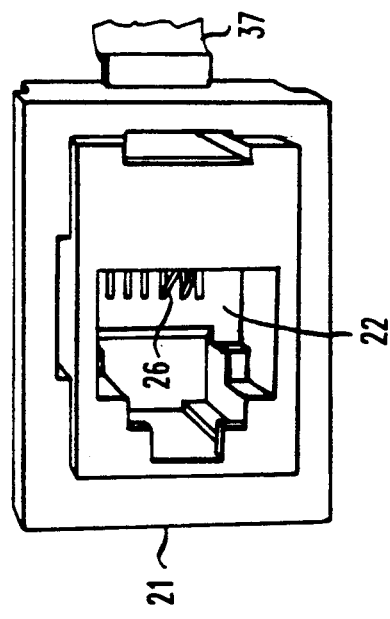
FIG. 3 is a perspective view of a portion of the assembly of FIG. 2.

Adjacent to each connector 11 is a bridge assembly 20 which is shown in detail in the views of FIGS. 2-4. As shown in FIG. 3, the assembly includes a jack 21 having an aperture 22 for receiving the RJ11 plug (15 of FIG. 1). A dust cover, 23 of FIG. 4, is provided on the face of the jack including the aperture 22. This cover, which is typically made of a rubber material, includes an aperture 24, essentially identical to the aperture 22 in the jack. The remainder of the cover seals the jack from the outside environment.

The jack 21 also includes an insert plug, 25 of FIG. 2, having prongs, 26 of FIG. 3, positioned within the aperture 22 so as to provide an electrical connection to the RJ11 plug when it is inserted in the aperture 22. The prongs 26 are electrically coupled to a pair of wires, 26 and 27 of FIG. 2, extending from the rear of the plug. The wires, in turn, are electrically coupled to a maintenance terminal unit (MTU) 28. An opposing pair of wires, 29 and 30, coupled to the MTU are adapted for coupling to the network side of the network interface unit of FIG. 1.

The bridge assembly, as shown in FIG. 2, further includes a compartment of housing 31. The housing includes a hinged cover 32 and a pair of side walls, 33 and 34, each wall including a slot, 35 and 36, respectively. The MTU 28 is placed within the compartment 31 so that the wires 26, 27 and 29, 30 extend through the slots, 36 and 35, respectively. The cover 32 is closed so that the MTU is secured within the compartment.

The jack 21 and compartment 31 are molded from a single piece of material, such as plastic, and are mechanically connected by a flexible hinge 37. The hinge is capable of flexing at least so that the back surface 45 of the plug and the surface 34 of the housing can make an angle between 0 and 90 degrees to permit mounting of the assembly in the network interface unit in the manner to be described.

It will also be noted that the plug 21 includes a latch member 38 at the top of the plug. The member comprises a cantilever portion 39 and a catch portion 40 which project toward the compartment 31, i.e., toward the back surface 45 of the plug. The back surface of the plug 21 also includes side ledges 41 and 42 (ledge 42 being obscured in the view of FIG. 2). The ledges and latch permit the bridge assembly to be mounted within the network interface unit as described below.

Figure 7:
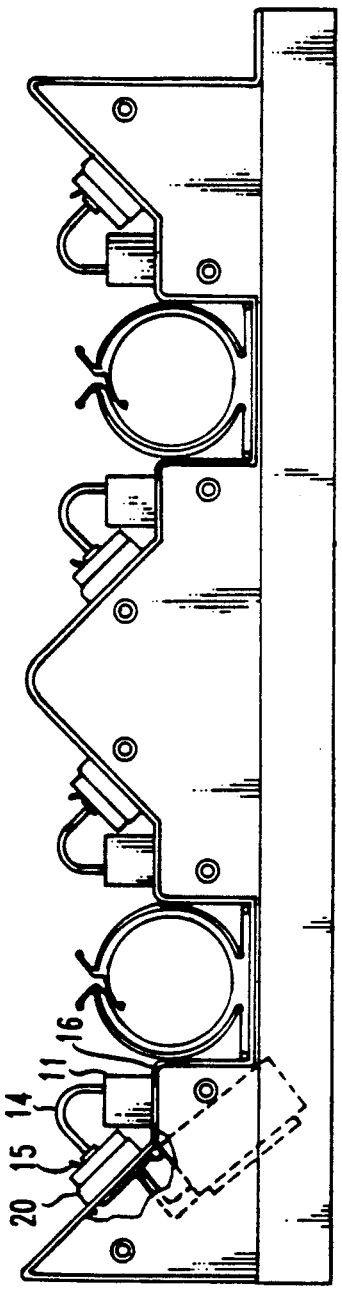
FIG. 7 is a side view of the unit of FIG. 1 illustrating the final position of the bridge assembly.
Figure 5:
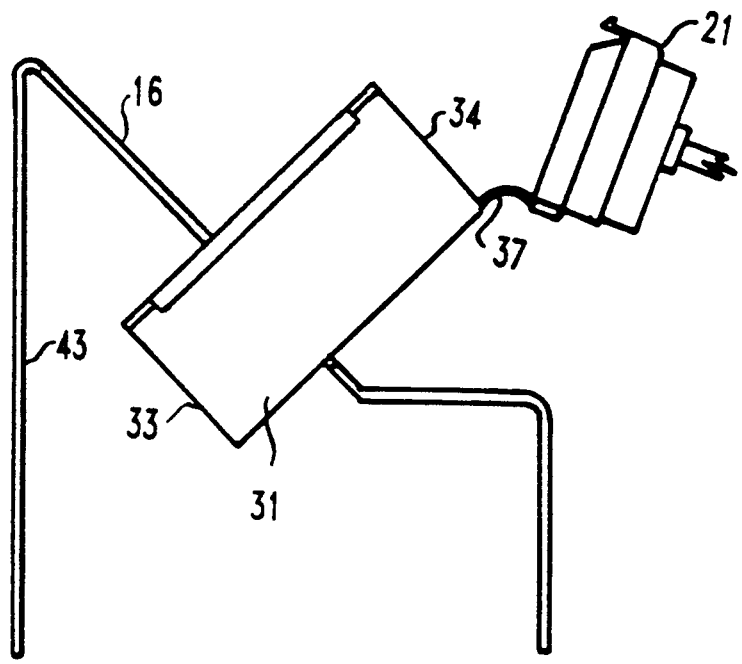
FIGS. 5-6 are side views of a portion of the unit of FIG. 1 illustrating the insertion of the bridge assembly of FIGS. 2-4.
Figure 6:
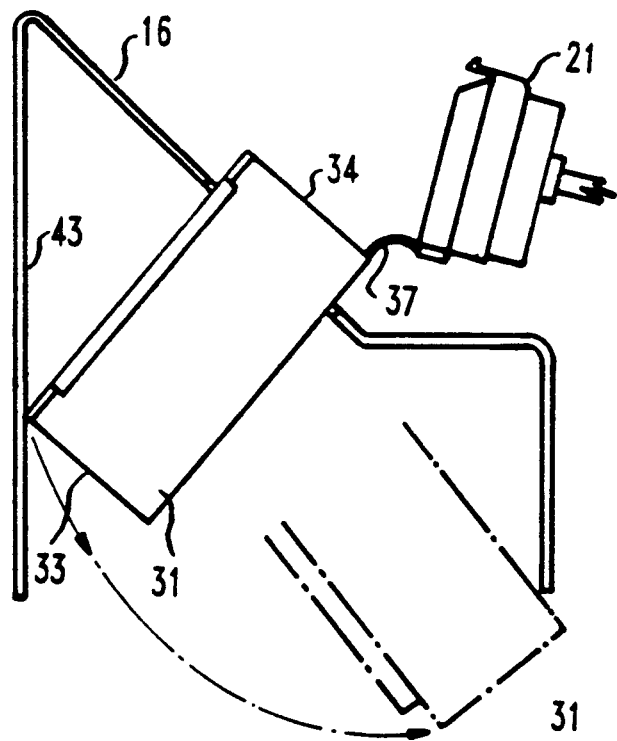

FIGS. 5-7 illustrate the mounting of the assembly of FIGS. 2-4 in the unit of FIG. 1. (The side walls and base portion of the unit have been omitted in FIGS. 5-6 for purposes of illustration.) The assembly is mounted in its associated hole in the chassis, 16, of the unit by inserting the compartment 31 first as shown in FIG. 5. At this point, the hinge is at a position so that the back face of the plug 21 and the side wall 34 of the compartment are at an angle of 90 degrees.

As the assembly is further inserted, as illustrated in FIG. 6, the side 33 of the compartment will make contact with the wall 43 of the chassis. This causes the hinge 37 to flex. Further insertion of the assembly, therefore, causes the compartment 31 to be pushed down and under the plug 21 as the hinge 37 continues to flex. In its final position, as shown in phantom in FIGS. 6 and 7, the wall 34 of the compartment 31 will typically make an angle of approximately 45 to 90 degrees with the back surface of the plug 21. In the example shown in FIG. 7, the compartment will be pushed to the right as a result of wires (not shown) which run through the chassis to the left of the compartment.

The plug will be prevented from further movement into the hole by the ledges, 41 and 42 of FIG. 2, making contact with the portion of the chassis surrounding the hole in which the assembly is inserted. The latch, 38 of FIG. 3, on the plug will prevent removal of the plug from the chassis hole unless pressure is exerted on the cantilevered member 39.

Various modifications of the invention will become apparent to those skilled in the art. For example, the compartment 31 could contain other types of electronic components, such as protector units, half-ringers, and RFI filters.

All such variations which basically rely on the teachings through which the invention has advanced the art are properly considered within the scope of the invention.

We claim:

1. A device comprising:
    a jack for mounting on a wall of a telecommunications unit chassis and having a plug receiving opening facing outward of the chassis;
    a housing for mounting in the interior of the chassis and including an electronic component therein electrically coupled to contacts supported in the jack; and
    a flexible hinge separating the jack and housing, the jack, housing and hinge being molded from a single material.

2. The device according to claim 1 wherein the electronic component comprises a maintenance termination unit.

3. The device according to claim 1 wherein the hinge is capable of flexing at least such that a surface of the plug and a surface of the housing make an angle between 0 and 90 degrees.

4. The device according to claim 1 wherein the housing comprises a pair of opposite side walls, each with a slot therein where wires from the component pass therethrough.

5. The device according to claim 1 wherein the jack includes a latch directed toward a back surface of the jack which faces the housing.

6. The device according to claim 1 wherein the jack comprises a front surface including said plug receiving opening, and further comprising a flexible cover on the front surface for sealing the jack.

7. The device according to claim 1 wherein the housing further comprises a hinged cover.

* * * * *